Patented Apr. 27, 1926.

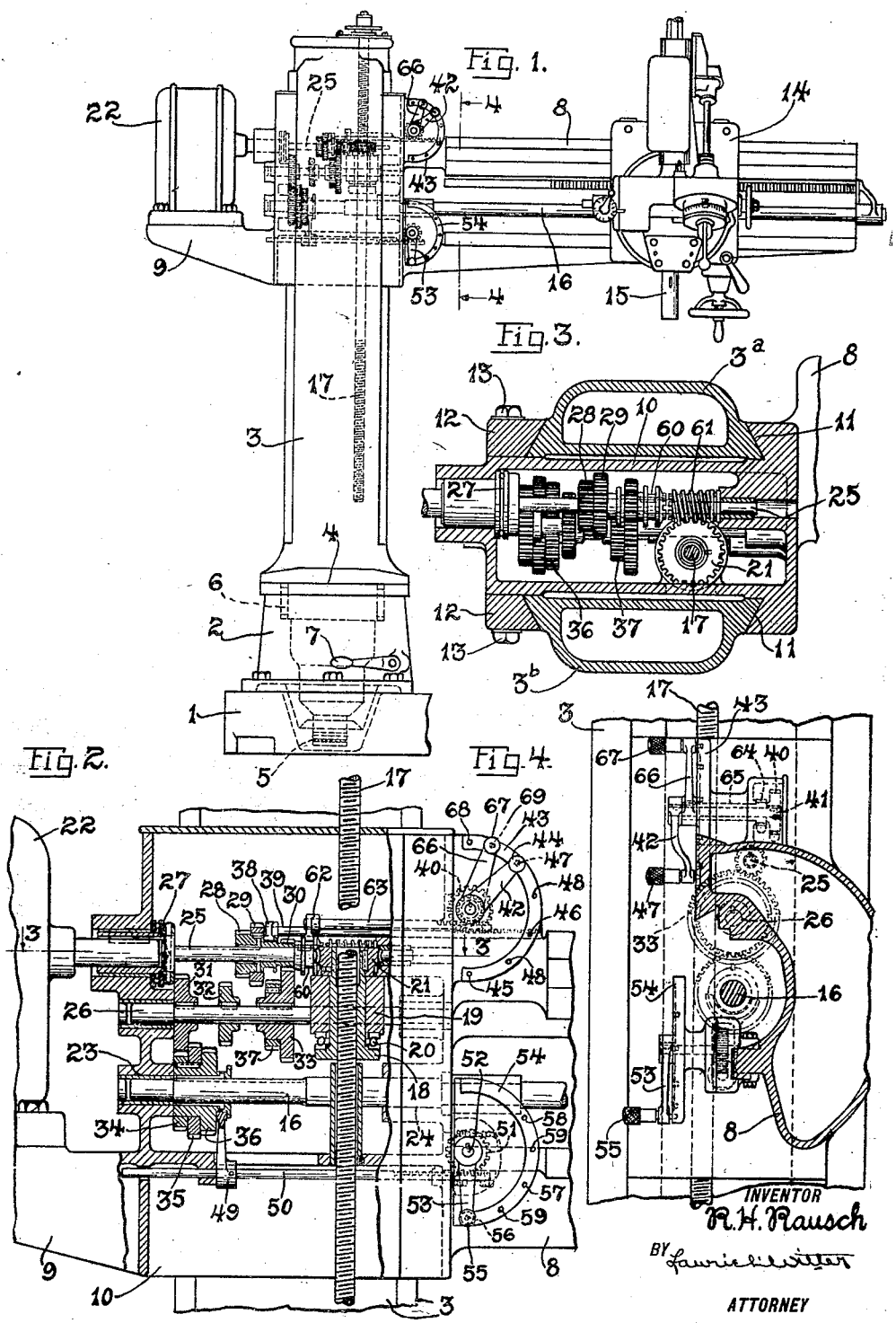

1,582,688

UNITED STATES PATENT OFFICE.

ROSWELL H. RAUSCH, OF PLAINFIELD, NEW JERSEY, ASSIGNOR TO NILES-BEMENT-POND COMPANY, OF NEW YORK, N. Y., A CORPORATION OF NEW JERSEY.

RADIAL DRILLING MACHINE.

Application filed February 8, 1924. Serial No. 691,411.

*To all whom it may concern:*

Be it known that I, ROSWELL H. RAUSCH, a citizen of the United States, residing at Plainfield, in the county of Union and State of New Jersey, have invented certain new and useful Improvements in Radial Drilling Machines, of which the following is a specification.

This invention relates to radial drilling machines of the type having a vertically divided column and a horizontal drill supporting arm vertically adjustably mounted between the parts of the column. Such a machine is shown, for example, in Patents Nos. 1,296,863 and 1,365,009 to W. T. Sears. In these machines, a motor and change speed gearing are mounted on the arm at the rear side of the column and are adapted through an arm shaft to drive the drill spindle supported in a saddle slidable on the arm at the front side of the column. When such a machine is to be used in close quarters requiring a conservation of space, it has been found that the projecting of the gear box and motor to an unnecessary distance beyond the column is objectionable. It will be understood that the construction permits the swinging adjustment of the arm about the column axis and sufficient space must of course be allowed at the rear of the column to permit clear horizontal swinging movement of the gear box and motor. The mechanism comprising the present invention is adapted to considerably shorten this overhanging portion of the arm and the primary object of the invention is to provide an improved radial drilling machine embodying this novel feature.

As shown in the accompanying drawing, I preferably shorten the overhanging rearward portion of the arm by rearranging the change speed gearing in a manner to house the same within the column, thus entirely eliminating the overhanging gear box shown in the above mentioned patents. In my improved drilling machine, the motor is the only rearwardly overhanging portion of the arm, the change speed gearing being supported on the arm entirely within the column. It is therefore another object of my invention to provide a radial drilling machine of the divided column type with drill operating means including change speed gearing mounted on the arm between the divided parts of the column.

A further object of my invention is to provide in a radial drill of the type just defined, means including a nut rotatable on a screw within the column for adjusting the arm vertically, means including a clutch for operatively connecting the motor to the nut and means mounted on the spindle side of the arm and adjacent the column for shifting the said change speed gearing to vary the speed imparted to the arm shaft from the motor and for shifting the said clutch.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is an elevational view of a radial drilling machine embodying my invention.

Fig. 2 is an enlarged fragmentary vertical sectional view through the arm and column.

Fig. 3 is a sectional plan view taken on line 3—3 of Fig. 2.

Fig. 4 is a view taken on line 4—4 of Fig. 1.

As concerns the general arrangement of parts of the machine illustrated in the accompanying drawing, the same are similar to those shown and described in the above cited patents. As illustrated, the machine comprises a base, preferably made up of two parts 1 and 2. Mounted on the part 2 of the base is a column 3 which is divided vertically into two similar parts 3ª and 3ᵇ. The column can be moved with respect to the base about a vertical pivotal axis and preferably the column is provided at 4 with a broad supporting surface which engages a corresponding surface on the base part 2. A ball bearing 5 is provided at or near the center of the column which assists in supporting the column, and there is provided a roller bearing 6 which serves to hold the column in position and prevent its movement away from the vertical. A suitable clamping mechanism is adapted to be operated by a lever 7. When the column is clamped by the said clamping mechanism, the supporting surface 4 engages the corresponding surface of the base part 2, thus providing a broad flat direct and rigid support for the column. This column clamping mechanism is illustrated and described in Patent No. 1,376,169.

As illustrated, the drill supporting arm comprises a drill saddle supporting portion 8, a motor supporting portion 9, and an intermediate portion 10 between the parts 3ª and 3ᵇ of the column. It will be understood that the arm can be an integral member as illustrated in the accompanying drawing or formed of separate members secured together, as shown in Patent No. 1,365,009. The intermediate portion 10 of the arm is guided for vertical movement between the two parts 3ª and 3ᵇ of the column. The arm has inclined surfaces 11, 11 engaging similarly inclined surfaces on the corresponding edges of the column parts. At the other side of the column, there are provided gibs 12, 12 having inclined surfaces which engage similarly inclined surfaces on the corresponding edges of the column parts. Bolts 13, 13 are provided for holding the gibs 12, 12 in place and these bolts are adjusted to bring the gibs into working engagement with the corresponding surfaces of the column parts without however effecting such a clamping action as would interfere with the free vertical movement of the arm.

Slidably mounted on the portion 8 of the arm is a saddle 14 carrying a head provided with a rotatable drill spindle 15. An arm shaft 16 extending along this portion of the arm is operatively connected to the drill spindle and extends into the column. The arm is supported by a screw 17 hung from the top of the column and extending downwardly into the column. A rotary nut 18 threadedly engages the screw within a bearing 19 on the arm, antifriction means 20 being provided between the bearing and a supporting flange on the lower end of the nut. The nut is adapted to be rotated, as hereinafter described, by a worm gear 21 keyed to the upper end thereof.

The arm shaft 16 and nut 18 are adapted to be rotated by a motor 22 mounted on the portion 9 of the arm. The driving connections from the motor to the shaft 16 and nut 18 are supported on the intermediate portion 10 of the arm and are housed between the two parts 3ª and 3ᵇ of the column. This mechanism will now be described.

The arm shaft 16 extends into the column and is supported therein in bearings 23 and 24 on the intermediate portion 10 of the arm. Two parallel shafts 25 and 26 are mounted in like manner above the arm shaft, the shaft 25 being directly connected to the motor armature shaft at 27. Splined to the shaft 25 is a cluster of three gears 28, 29 and 30 adapted to cooperate respectively with gears 31, 32 and 33 keyed to the intermediate shaft 26. Splined to the arm shaft is a similar cluster of three gears 34, 35 and 36 adapted to cooperate respectively with gears 31, 32 and 37 also secured on the intermediate shaft 26. By shifting the two gear clusters to their different driving positions, the arm shaft can be driven from the motor at nine different speeds.

The means for shifting the gear clusters just described is preferably located in a position most convenient to the operator. The gear cluster 28, 29 and 30 is provided with an annular groove within which engages a yoke 38 mounted on a sliding rod 39 extending outwardly toward the saddle 14. The outer end of this rod is toothed and is engaged by a gear 40 on a shaft 41 extending forwardly in the arm and provided with an operating lever 42 thereon. Movement of the lever over the arcuate plate 43 is adapted to rotate the gear 40 and shift the gear cluster along its shaft. A detent 44 on the lever is adapted to cooperate with holes 45, 46 and 47 in the plate to hold the gear cluster respectively in driving engagement with gears 31, 32 and 33. With the detent in either of holes 48, the gears will be held in a neutral and non-driving position.

The means for shifting the gear cluster 34, 35 and 36 is similar to that just described. A yoke 49 on a sliding rod 50 engages within an annular groove in this gear cluster. A gear 51 on a shaft 52 in the arm is in mesh with rack teeth on this rod. An operating lever 53 on the shaft is movable over an arcuate plate 54 in the gear shifting operation. A detent 55 on the lever is adapted to cooperate with holes 56, 57 and 58 in the plate to hold the gear cluster respectively in driving engagement with the gears 31, 32 and 37. With the detent in either of holes 59, the gears will be held in a neutral and non-driving position.

The driving connection from the motor to the worm gear 21 on the nut 18 comprises a clutch 60 splined to the shaft 25 and adapted to be engaged with a worm 61 loose on the shaft and in mesh with the worm gear. By engaging the clutch with the worm, the nut can be rotated in one direction or the other from the motor to elevate or lower the arm. The clutch shifting means comprises a yoke 62 mounted on a sliding rod 63 and engaging within an annular groove in the clutch. A pinion 64 on a tubular shaft 65 rotatably mounted on the shaft 41 is in mesh with rack teeth on this rod. An operating lever 66 is secured to the shaft 65 and is movable to two positions. With the detent 67 engaged in the hole 68, the clutch is engaged with the worm and with the detent engaged in the hole 69, the clutch is disengaged therefrom.

The invention as described and illustrated comprises a radial drilling machine particularly adapted for use where lack of space requires that the machine be constructed and operated as compactly as possible. Such requirement is essential for example where a battery of such machines are being operated in close proximity. The machine illustrated can be operated in very close quarters since, aside from the radial drill supporting arm which extends over the work support, the driving motor is the only part of the machine projecting outwardly from the column. Furthermore, due to the novel method of mounting and housing the change speed gearing and arm elevating mechanism within the column, none of the advantages of this type of radial drill, as shown in the patents above mentioned, have been sacrificed. The novel mechanism illustrated also includes means most convenient to the operator's usual position at the machine for controlling both the change speed gearing and the arm elevating mechanism.

What I claim is:

1. In a radial drilling machine, the combination of a base, a vertically divided column mounted thereon, a horizontal arm vertically adjustably mounted between the parts of the column, drill spindle supporting mechanism slidably mounted on a portion of the arm at one side of the column, a spindle operating shaft extending along such portion of the arm and into the column, a power shaft, and means including change speed gearing on the arm within the column for operatively connecting the power shaft and arm shaft.

2. In a radial drilling machine, the combination of a base, a vertically divided column mounted thereon, a horizontal arm vertically adjustably mounted between the parts of the column, drill spindle supporting mechanism slidably mounted on a portion of the arm at one side of the column, a spindle operating shaft extending along such portion of the arm and into the column, a motor adjacent the column, means including change speed gearing on the arm within the column for operatively connecting the motor and shaft, screw threaded means for adjusting the arm vertically, and means providing an operative connection from the motor to the screw threaded means for elevating and lowering the arm.

3. In a radial drilling machine, the combination of a base, a vertically divided column mounted thereon, a horizontal arm vertically adjustably mounted between the parts of the column, drill spindle supporting mechanism slidably mounted on a portion of the arm at one side of the column, a spindle operating shaft extending along such portion of the arm and into the column, a motor on the arm at the other side of the column, and change speed gearing on the arm within the column for operatively connecting the motor and shaft.

4. In a radial drilling machine, the combination of a base, a vertically divided column mounted thereon, a horizontal arm vertically adjustably mounted between the parts of the column, drill spindle supporting mechanism slidably mounted on a portion of the arm at one side of the column, a spindle operating shaft extending along such portion of the arm and into the column, a motor on the arm at the other side of the column, change speed gearing on the arm within the column for operatively connecting the motor and shaft, and means mounted on the drill spindle side of the arm and adjacent the column for shifting the said gearing to vary the speed imparted to the shaft from the motor.

5. In a radial drilling machine, the combination of a base, a vertically divided column mounted thereon, a horizontal arm mounted between the parts of the column, screw threaded means for adjusting the arm vertically, drill spindle supporting mechanism slidably mounted on a portion of the arm at one side of the column, a spindle operating shaft extending along such portion of the arm and into the column, a motor on the arm at the other side of the column, change speed gearing on the arm within the column for operatively connecting the motor and shaft, and means providing an operative connection between the motor and screw threaded means whereby the arm can be adjusted vertically by the motor.

6. In a radial drilling machine, the combination of a base, a vertically divided column mounted thereon, a horizontal arm mounted between the parts of the column, a vertically extending screw within the column, a nut supporting the arm and threadedly engaging the screw, drill spindle supporting mechanism slidably mounted on a portion of the arm at one side of the column, a spindle operating shaft extending along such portion of the arm and into the column, a motor on the arm at the other side of the column, change speed gearing on the arm within the column for operatively connecting the motor and shaft, and means providing an operative connection between the motor and nut whereby the arm can be adjusted vertically by the motor.

7. In a radial drilling machine, the combination of a base, a vertically divided column mounted thereon, a horizontal arm mounted between the parts of the column, a vertically extending screw within the column, a nut supporting the arm and threadedly engaging the screw, drill spindle supporting mechanism slidably mounted on a portion of the arm at one side of the column, a spindle operating shaft extending along such portion of the arm and into the column, a motor on the arm at the other side of the column, change speed gearing on the arm within the column for operatively connecting the motor and shaft, means including a clutch providing an operative connection between the motor and nut whereby the arm can be adjusted vertically by the motor, and means mounted on the drill spindle side of the arm and adjacent the column for shifting the said gearing to vary the speed imparted to the shaft from the motor and for shifting the said clutch.

In testimony whereof, I hereto affix my signature.

ROSWELL H. RAUSCH.